United States Patent
Watzek

(10) Patent No.: US 12,381,445 B2
(45) Date of Patent: Aug. 5, 2025

(54) ROTOR BEARING ARRANGEMENT FOR ELECTRIC MOTOR

(71) Applicant: JOHNSON ELECTRIC INTERNATIONAL AG, Murten (CH)

(72) Inventor: Michael Watzek, Courgevaux (CH)

(73) Assignee: JOHNSON ELECTRIC INTERNATIONAL AG, Murten (CH)

(*) Notice: Subject to any disclaimer, the term of this patent is extended or adjusted under 35 U.S.C. 154(b) by 286 days.

(21) Appl. No.: 18/311,576

(22) Filed: May 3, 2023

(65) Prior Publication Data

US 2023/0268800 A1 Aug. 24, 2023

Related U.S. Application Data

(63) Continuation of application No. PCT/EP2021/067563, filed on Jun. 25, 2021.

(30) Foreign Application Priority Data

Nov. 4, 2020 (EP) .................................... 20205763

(51) Int. Cl.
*H02K 7/08* (2006.01)

(52) U.S. Cl.
CPC .................................. *H02K 7/088* (2013.01)

(58) Field of Classification Search
CPC ............ H02K 7/00; H02K 7/08; H02K 7/088; H02K 5/00; H02K 5/15; H02K 5/24; F16C 17/00; F16C 17/02; F16C 27/00; F16C 27/02; F16C 23/00; F16C 23/04; F16C 23/045; F16F 1/00; F16F 1/38; F04D 25/00; F04D 25/06; F04D 29/00; F04D 29/66; F04D 29/668
See application file for complete search history.

(56) References Cited

U.S. PATENT DOCUMENTS 3,701,912 A * 10/1972 Schulze ............... H02K 5/1677
                                                                  310/90
2015/0275962 A1* 10/2015 Sakon ................... F16C 25/083
                                                                  384/517

FOREIGN PATENT DOCUMENTS

DE          3828609 A1     3/1990
DE          4136485 A1     5/1993

OTHER PUBLICATIONS

International Search Report from Corresponding PCT/EP2021/067563 Oct. 5, 2021.

* cited by examiner

*Primary Examiner* — Tran N Nguyen
(74) *Attorney, Agent, or Firm* — Aird & McBurney LP

(57) ABSTRACT

A rotor bearing arrangement is provided for supporting a rotor shaft (14) of an electric motor having a longitudinal axis (L). The rotor bearing arrangement comprises a bearing saddle (18) for radially supporting a rotor shaft (14) of the electric motor in an operating state of the electric motor; and a biasing means for exerting a biasing force (F1) towards the bearing saddle (18) in an operating state of the electric motor. The rotor bearing arrangement is characterised in that the bearing saddle (18) is shaped such that it forms a dedicated main first contact area (36a) and a dedicated main second contact area (36b) designed to contact the rotor shaft (14) of the electric motor in an operating state of the electric motor.

11 Claims, 5 Drawing Sheets

ROTOR BEARING ARRANGEMENT FOR ELECTRIC MOTOR

CROSS REFERENCE TO RELATED APPLICATIONS

This non-provisional patent application is continuation application of PCT Application No. PCT/EP2021/067563, filed with the European Patent Office on 25 Jun. 2021, which claims priority to European Patent Application No. EP2020205763, filed on 4 Nov. 2020, all of which are incorporated herein by reference in their entirety.

TECHNICAL FIELD

The present invention relates to a rotor bearing arrangement for an electric motor. The invention further relates to a drive assembly for an electric motor comprising such a rotor bearing arrangement.

BACKGROUND

In an electric motor, the rotor will be provided with a rotor shaft, which is retained in position along the axis of rotation of the rotor. This is typically achieved by fixing the rotor shaft in the motor housing so as to be captive in the radial directions.

The most common solution for such a bearing is a sleeve bearing, A full cylindrical bushing could be provided which is dimensioned to receive the rotor shaft in an internal bore. However, some clearance between the bearing surface and a shell surface of the rotor is required to permit rotation, which results in radial drift. Any deviation of the rotor shaft from the theoretically optimal axis of rotation will lead to increased noise, and eventually wear, reducing the lifetime of the electric motor.

The rotor shaft is allowed to slide back and forth along the rotor axis in a predefined manner within certain thresholds in an operating state of the electric motor. Excessive rolling or bouncing of the rotor shaft during its operation is undesirable as it is, causing noise to be generated and increasing the risk of wear. An alternative bearing configuration is therefore desirable.

DISCLOSURE OF THE INVENTION

The object of the present invention is therefore to provide a rotor bearing arrangement for an electric motor and an electric motor fitted with such a rotor bearing arrangement that is more that is more silent in an operating state of the electric motor.

According to a first aspect of the invention, there is provided a rotor bearing arrangement to be rotatably mounted on a fixed rotor shaft of an electric motor having a longitudinal axis, the rotor bearing arrangement comprising: a bearing saddle for radially mounting on a rotor shaft of the electric motor in an operating state of the electric motor; and a biasing means for exerting a biasing force towards the bearing saddle in an operating state of the electric motor; and characterised in that the bearing saddle is shaped such that it forms a dedicated main first contact area and a dedicated main second contact area designed to directly contact the rotor shaft of the electric motor in an operating state of the electric motor.

A bearing saddle which has been adapted so as to provide spaced apart dedicated points of contact with a rotor shaft is much less likely to experience bouncing, rolling, or wobbling effects as the rotor rotates. As such noise and wear issues are much reduced for a motor having such a rotor bearing arrangement.

Optionally, the bearing saddle may be or substantially be V-shaped in a plane perpendicular to the longitudinal axis.

A V-shaped profile for the support surface will have a desirable contact angle with the rotor shaft, which in one embodiment, might be approximately 45°. The exact angle will, however, be dependent on the friction in the rotor bushing. This will result in a reduction increase frictional hold on the rotor shaft to inhibit rolling motion up or down the support surface.

Preferably, the first and second main contact areas of the V-shaped bearing saddle may be symmetric with respect to the direction of the biasing force.

It is desirable that there is a uniformity of the force applied by the rotor bushing on the rotor shaft, which can be readily achieved using a symmetric rotor-shaft support surface.

The first and second main contact areas may be formed as planar surfaces of the V-shaped bearing saddle.

The planar surfaces of such a bearing saddle should have a contact angle which equals or is greater than the inverse tangent of the static coefficient of friction in order to inhibit rolling. There is a significantly reduced propensity for the rotor shaft to roll up one side of the bearing saddle in such an arrangement.

In an alternative embodiment, a shape of at least one of the first and second main contact areas may be at least in part concave or at least in part convex in a plane perpendicular to the longitudinal axis.

Opposed distinguishable side surfaces can be formed as to be concave, thereby largely following the curvature of the rotor shaft itself. This reduces wear on the rotor shaft by the rotor bushing and vice versa, significantly extending the life of a motor into which the rotor bushing is integrated. A wide range of different shapes of bearing saddles can be considered which still meet the requirement of forming two, or perhaps more, points of contact with a rotor shaft. This choice may be made based on, for instance, manufacturing requirements.

A radius of the at least in part concave first and/or second main contact area may be larger than a radius of the rotor shaft to be supported. This configuration may reduce the likelihood of jamming of the rotor shaft in the bearing saddle.

Preferably, the biasing means may comprise a pusher having at least one dedicated further contact area designed to touch the rotor shaft of the electric motor in an operating state of the electric motor. The number of dedicated further contact areas may preferably be two.

A pusher will typically provide two points of contact with the rotor shaft to compensate for play in the seating of the rotor shaft in the bearing saddle, and therefore, for an even hold, it is preferred that the counterpart rotor bushing of the bushing also be capable of providing two points of contact, at corresponding positions to the compensator element. This results in uniform force being applied on both sides of the rotor shaft. A half-cylindrical bearing saddle will not be able to create this, since there will only be a single point of contact, in line with the force axis of the compensator element. The multiple points of contact are therefore created by the paired side support surfaces forming the aforementioned bearing saddle.

The rotor bearing arrangement may further comprise at least one guide element for guiding the pusher uniformly towards the bearing saddle.

A guide element can assist with limiting the lateral displacement of the pusher which can naturally occur from recoil of the rotor shaft.

Optionally, the dedicated first contact area, the dedicated second contact area and the at least one dedicated further contact area may be arranged relative to one another such that the biasing force is divided uniformly to the dedicated first contact area and the dedicated second contact area in an operating state of the electric motor.

Uniformity of contact around the rotor shaft will result in a better hold on the rotor shaft. Having, for instance, four points of contact between the rotor shaft and the rotor bushing in a square configuration, as opposed to three in an isosceles triangular arrangement, increases the frictional contact with the rotor shaft in a uniform manner. The rotor shaft cannot then undergo a rolling and sliding action, that is, a wobbling action, which leads to noise and wear in an operational state of the electric motor.

In one preferable embodiment, the pusher may comprise first and second pusher elements which are arranged to move in the direction of the biasing force.

A pair of pusher elements allows for greater compensation to be applied on one side or other of the bearing saddle via discrete biasing forces, which may further limit the rolling behaviour of the rotor shaft which will naturally occur in one direction preferentially due to the rotation of the rotor.

BRIEF DESCRIPTION OF THE FIGURES

The invention will now be more particularly described, by way of example only, with reference to the accompanying drawings, in which.

DETAILED DESCRIPTION

Figure 1:
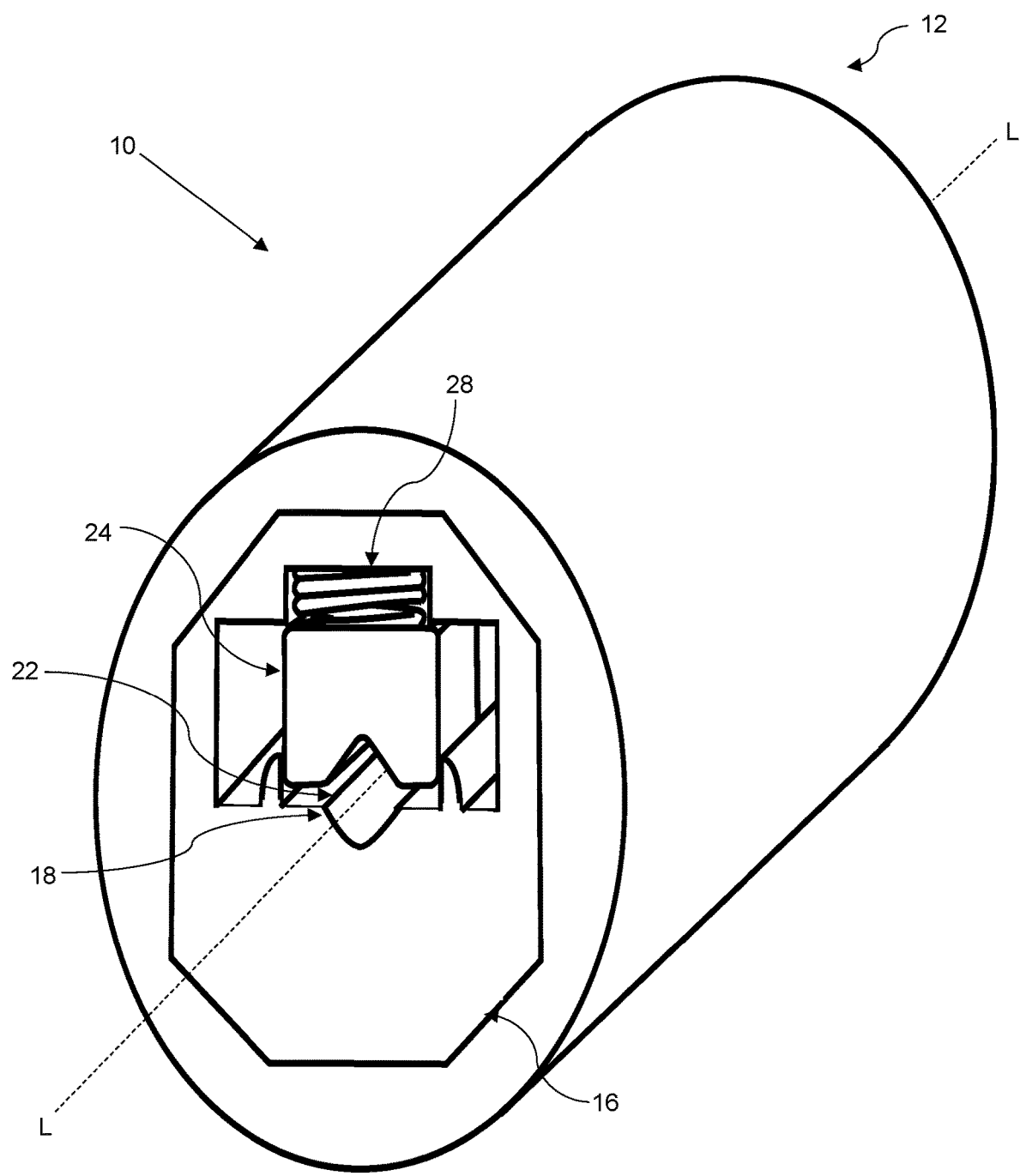
FIG. 1 shows a perspective representation of a first embodiment of a drive assembly having a rotor bearing arrangement in accordance with the first aspect of the invention, the rotor shaft being omitted for clarity.
Figure 2:
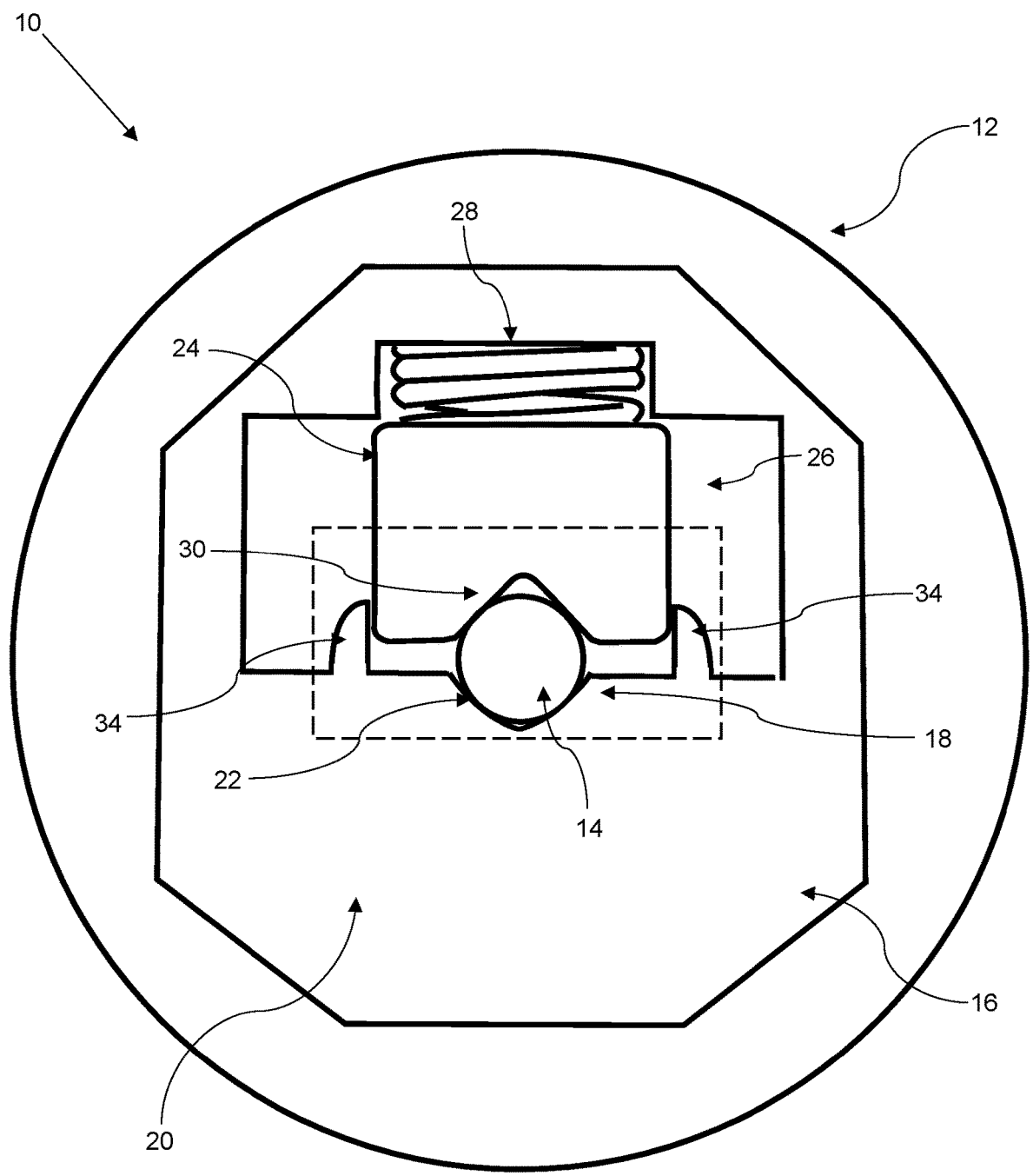
FIG. 2 shows an end view of the drive assembly of FIG. 1, inclusive of the rotor shaft.

Referring to FIG. 1, there is indicated a rotor assembly 10 of a motor which has a rotor 12 which is engaged with a rotor shaft 14, the position of which is shown in FIG. 2. The axis of rotation of the rotor 12 extends out of FIG. 2, and therefore the purpose of the present invention is to minimise rolling or bouncing effects of the rotor shaft 14 as the rotor 12 rotates.

The rotor 12 has a cylindrical body, and is engaged with an end face 16 of the rotor 12 which may be formed as an internal member over which the main body of the rotor 12 is moulded. Alternatively, the end face 16 may engage with or form an end cap of the motor, or may be formed as part of a support structure with which the rotor 12 engages in an electric motor. One example of such a support structure might be an actuator housing. The end face 16 has, at its centre-point, a bearing saddle 18 which supports a lateral side of the rotor shaft 14 in operation.

The bearing saddle 18 is preferably integrally formed with the end face 16 of the rotor, for example, via an injection molding, and preferably an overmolding process. The bearing saddle18 may therefore be formed by a projecting portion 20 of the end face 16, such that, a rotor-shaft support surface 22 which extends in parallel with the longitudinal axis L of rotation of the rotor 12 is created. In other words, the depth of the projecting portion 20 yields the rotor-shaft support surface 22. The rotor shaft 14 therefore can rest against the rotor-shaft support surface 22 of the bearing saddle 18 in use.

The rotor 12 further includes a biasing means, which here includes a pusher 24 which is engaged with the end face 16 of the rotor 12, preferably within the depth of the projecting portion 20. A dedicated receiving area 26 which is dimensioned to receive the pusher 24 may be provided on the end face 16.

The pusher 24 is, in the present embodiment, formed as a unitary component, and configured so as to be moveable within the receiving area 26 along a force axis. This force axis is directed towards the bearing saddle 18, and is designed to retain the rotor shaft 14 along the axis of rotation L, and thereby negate any deleterious effects which may be caused by the shaft rolling or bouncing in the bearing saddle 18. In other words, the force axis is perpendicular to the longitudinal axis, and is directed from the biasing means to the bearing saddle 18.

To apply a force along the force axis, the biasing means further comprises a biasing member associated with the pusher 24. In this instance, the biasing member is in the form of a coil spring 28 which urges the pusher 24 towards the bearing saddle 18. Other types of bias could be considered, however, for instance, leaf springs, flexible tangs, or resiliently deformable members. A U-shaped spring, for example, positioned in the receiving area 26, would produce the same effect.

Figure 3:
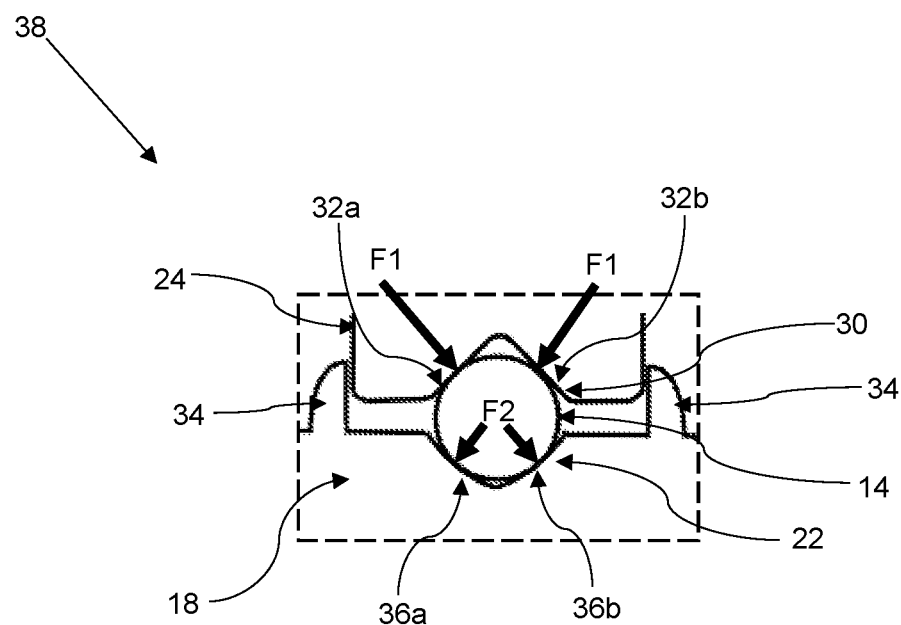
FIG. 3 shows an enlarged end view of the rotor bearing arrangement of FIG. 2 at the rotor shaft, indicating points of contact between the rotor shaft and the bearing saddle and pusher.

The pusher 24 is formed as a block, sometimes referred to as a brake shoe, having a shaft-contact surface 30 which faces the rotor bushing 18. The shaft-contact surface 30 is formed having two opposing contact surfaces, thereby forming first and second contact areas 32a, 32b which are angled to one another to form or substantially form a 'V' shape, indicated in detail in FIG. 3. This results in a triangular receiving portion into which the rotor shaft 14 can fit. The opposing contact areas 32a, 32b are shown as being planar in the embodiment of FIGS. 1 and 2, but could alternatively be arcuate, concave, or convex.

The pusher 24 in use, will urge a rotor shaft 14 towards the bearing saddle 18 under the biasing force of the spring 28 to counter the effect of clearance against the bearing saddle 18. The rotor shaft 14 will then contact with the rotor-shaft support surface 22 of the bearing saddle 18. One or more guide elements 34 may be utilised, here provided as upstanding projections spaced apart by approximately the width of the pusher 24. These guide elements 34 may thus prevent any lateral displacement of the pusher 24, which could occur during rotation of the rotor 12. In the present invention, these guide elements 34 are provided as part of the projecting portion 20 of the end face 16 of the rotor 12, and therefore have a fixed relative position with respect to the bearing saddle18 itself.

The rotor-shaft support surface 22 is formed so as to preferably present a non-cylindrical surface to the pusher 24 when it is biased along the force axis. In this instance, this is provided as the non-circular rotor-shaft support surface 22 being V-shaped or substantially V-shaped. Other geometric configurations could be conceived, however.

The term 'non-cylindrical' here refers to the shape of the rotor-shaft support surface 22, which is dimensioned to receive a cylinder, the rotor shaft 14 thereon. If the rotor-shaft support surface 22 had pure cylindrical topology, the rotor shaft 14 would rest perfectly therein, with no void between the rotor-shaft support surface 22 and the rotor shaft 14 on the force axis of the compensator element 24. It is this topology which is referred to, rather than the rotor-shaft support surface 22 forming the complete shape of a cylinder; even in the art, such a cylindrical surface would at most only form a half-cylinder.

The rotor-shaft support surface 22 comprises first and second opposed side support surfaces forming first and second dedicated main contact areas 36a, 36b. The first and second opposed support surfaces may join in a non-continuous arc across the rotor-shaft support surface 22, though alternative configurations could be considered, examples of which are discussed below. Rather than a rotor shaft 14 matingly seating into the bearing saddle 18, this configuration means that there is a gap or void at or adjacent to the nadir of the bearing saddle 18, that is the point at which the first and second main contact areas 36a, 36b meet. For improved wear resistance, this nadir is on the force axis.

The first and second opposed side support surfaces are concave in the illustrated embodiment, thereby forming at least in part, and preferably fully, concave first and second main contact areas 36a, 36b. This improves wear resistance from rotation against the rotor shaft 14, which could otherwise lead to incorrect alignment of the rotor shaft 14 in the bearing saddle 18. Whilst the first and second opposed side support surface meet one another, and therefore directly correspond with the first and second main contact areas 36a, 36b, it will be appreciated that one or more intermediate, non-contacting surfaces be provided as part of the bearing saddle 18. One proposed variant is discussed in the second embodiment of FIG. 4 below.

Other forms of side support surface could be considered however, such as convex or planar surfaces. The important aspect functionally is that the bearing saddle 18 supports the rotor shaft 14 in use at least, and preferably only, two points of contact. Other embodiments are discussed below. There is thus no requirement that the bearing saddle 18 be formed from a single unitary component. It is the relative positions of the first and second main contact areas 36a, 36b that is important for the formation of the bearing saddle.

When a standard rotor shaft 14 is introduced into the triangular receiving portion, there will be two points of contact with the rotor shaft 14; one on either opposing contact areas 32a, 32b of the pusher 24. This is shown by the arrows on the rotor shaft 14 in FIG. 3, which is indicative of retaining forces of the rotor bearing arrangement 38 acting on the rotor shaft 14. The pusher 24 applies a biasing force F1 at two positions on the rotor shaft 14, which in turn urges the rotor shaft 14 against the first and second main contact areas 36a, 36b of the bearing saddle 18, also indicated by arrows in FIG. 3, which indicate retaining force F2, and these can be seen to be symmetric about the force axis. This can be readily achieved by ensuring that the bearing saddle 18 is itself symmetric, despite any discontinuity in the arc gradient or shape of the rotor-shaft support surface 22. The bearing saddle 18 could, of course, easily be made to be asymmetric whilst still creating uniformly-spaced first and second main contact areas 36a, 36b, for example, by providing different slopes for each of the opposing support surfaces.

The bearing saddle 18 and pusher 24 are thus dimensioned to create four points of contact with the rotor shaft 14 in a square configuration. This advantageously means that the points of contact between the first main contact area 36a of the bearing saddle 18 and the second further main contact area 32b of the pusher 24 will be diametrically opposed, as will the second main contact area 36b and first further main contact area 32a. Furthermore, this will inhibit rolling of the rotor shaft 14 relative to the bearing saddle 18 and thus rotor 12. In this context, rolling refers to a divergent movement of the rotor shaft 14 whereby the rotor centre line and shaft centre line are displaced relative to the longitudinal axis L.

Rolling of the rotor shaft 14 will occur until the contact angle is equal to the inverse tangent of the static friction coefficient. With the lateral contact points created by the rotor-shaft support surface 22, the contact angle may be approximately 45°, though as noted, this is dependent on the coefficient of friction of the rotor bushing 18. This is much larger than the inverse tangent of the static friction coefficient, and the rotor shaft 14 will only slide relative to the rotor bushing 12, rather than roll or bounce. This has the added effect of reducing noise generation. A drive assembly 10 comprising the rotor 12 and rotor shaft 14 therefore represents a significant improvement over the state of the art.

Using this rotor assembly 10, an electric motor can be provided which has reduced noise output compared with those in the art utilising standard bushings, as well as having an extended operational lifetime due to the improved wear resistance.

It is noted that whilst first and second opposing side surfaces of the rotor-shaft support surface are disclosed, an increased number of points of contact could be created, for example, in a hexagonal contact configuration, by increasing the number of non-continuous support surfaces. This applies for both the bearing saddle and the pusher.

Figure 4:
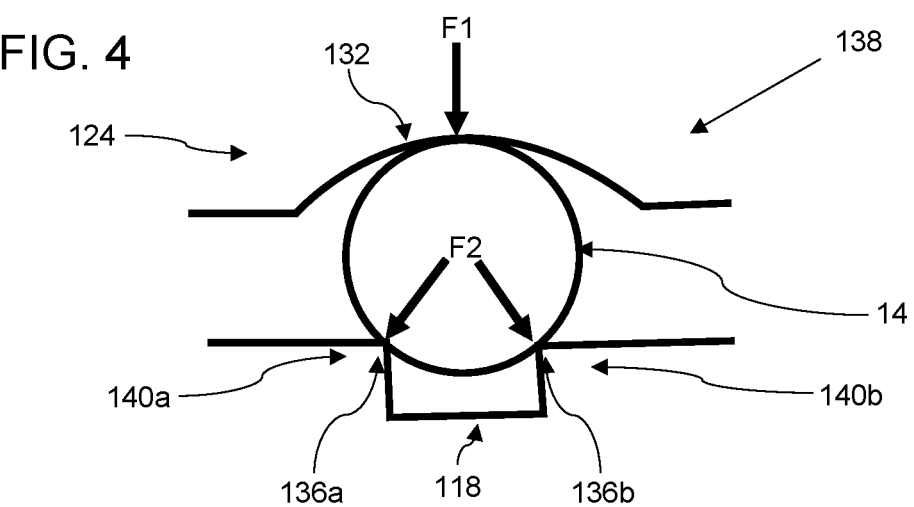
FIG. 4 shows an enlarged end view of a second embodiment of a rotor bearing arrangement in accordance with the first aspect of the invention.

One such alternative embodiment is illustrated in FIG. 4, in which the rotor bearing arrangement is indicated generally at 138. Identical or similar components identified in respect of the first embodiment will be referenced using identical or similar reference numerals and further detailed description is omitted for brevity.

The rotor shaft 14 is held between the pusher 124 and the bearing saddle 118, as is the case for the first embodiment. However, the pusher 124 now has a single contact area 132 which is formed by an arcuate surface thereof. The cross-section can therefore be described as being semi- or part-circular. The radius of the cross-section is larger than that of the radius of the rotor shaft 14. The biasing force F1 is therefore applied at a single point of contact centrally on the rotor shaft 14.

The bearing saddle 118 is now formed by a cuboidal void in the end face 116 of the rotor, against which the rotor shaft 14 is urged in an operational state of the rotor. There is no longer a specific rotor-support surface, but instead two dedicated points of contact with the corners 140a, 140b of the bearing saddle 118, thereby forming two spaced apart main contact areas 136a, 136b. The retaining forces F2 are therefore applied to the main contact areas 136a, 136b as in the first embodiment.

Figure 5:
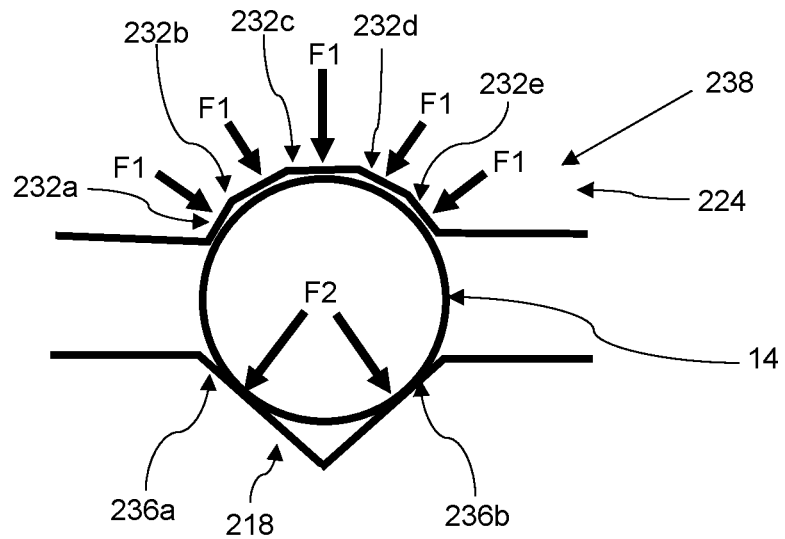
FIG. 5 shows an enlarged end view of a third embodiment of a rotor bearing arrangement in accordance with the first aspect of the invention.

A further alternative embodiment is illustrated in FIG. 5, in which the rotor bearing arrangement is indicated generally at 238. Identical or similar components identified in respect of the first and second embodiments will be referenced using identical or similar reference numerals and further detailed description is omitted for brevity.

The rotor shaft 14 is held between the pusher 224 and the bearing saddle 218, the pusher 224 having a multi-faceted or polygonal surface which forms a plurality of spaced-apart contact areas 232a, 232b, 232c, 232d, 232e. A plurality of biasing forces F1 are applied to the rotor shaft 14, with the net force being applied along the force axis as in the previous embodiments. The polygonal cross-section of the pusher 224 ensures that several points of contact are made with the rotor shaft 14 in user.

The bearing saddle 218 is more closely related to that of the first embodiment, having opposed contact surfaces forming the first and second main contact areas 236a, 236b. Instead of slightly concave shaping however, the contact surfaces are formed so as to be planar, the bearing saddle 218 thus having a V-shaped profile in a plane perpendicular to the longitudinal axis L of the rotor. Planar surfaces have the advantage of the contact angle being equal to the inverse tangent of the static friction coefficient, as discussed in respect of the first embodiment of the invention.

Figure 6:
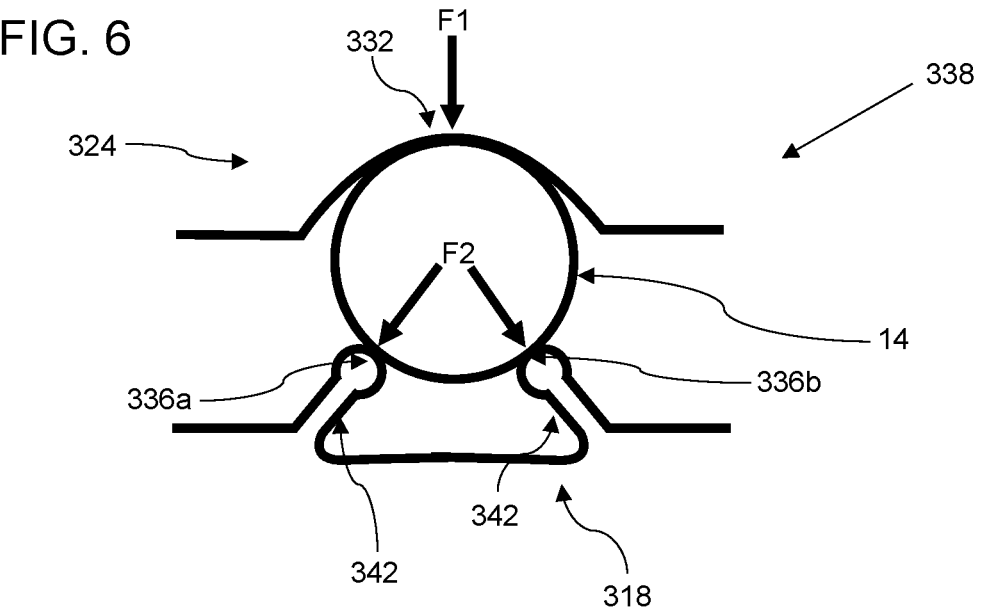
FIG. 6 shows an enlarged end view of a fourth embodiment of a rotor bearing arrangement in accordance with the first aspect of the invention.

Yet another alternative embodiment is illustrated in FIG. 6, in which the rotor bearing arrangement is indicated generally at 338. Identical or similar components identified in respect of the first, second and third embodiments will be referenced using identical or similar reference numerals and further detailed description is omitted for brevity.

The rotor shaft 14 is held between the pusher 324 and the bearing saddle 318, as in the preceding embodiments. The pusher 324 is identical to that of the second embodiment, yielding a single point of contact from its further main contact area 332.

The bearing saddle 318 is very different, however. There is no continuous rotor-shaft support surface, and instead the first and second main contact areas 336a, 336b are formed by first and second projecting arms 342 which extend in the direction of the pusher 324. Top surfaces of the projecting arms 342 thereby create the bearing saddle 318.

Various different bearing saddle and pusher or biasing means are described in respect of the embodiments above, and it will be apparent to the skilled person that any given bearing saddle configuration described could be readily substituted in any embodiment, and therefore none of the bearing saddle configurations are mutually exclusive with any of the pusher or biasing means configurations listed.

Figure 7:
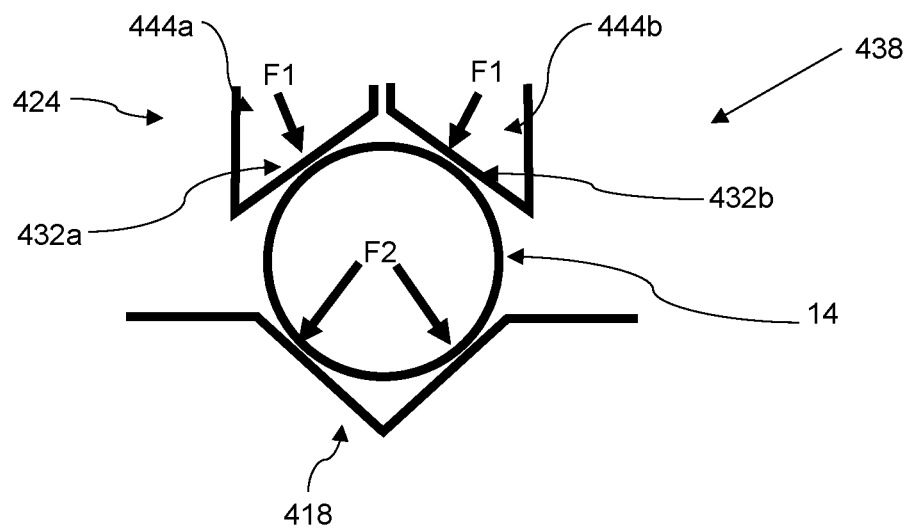
FIG. 7 shows an enlarged end view of a fifth embodiment of a rotor bearing arrangement in accordance with the first aspect of the invention.
Figure 8:
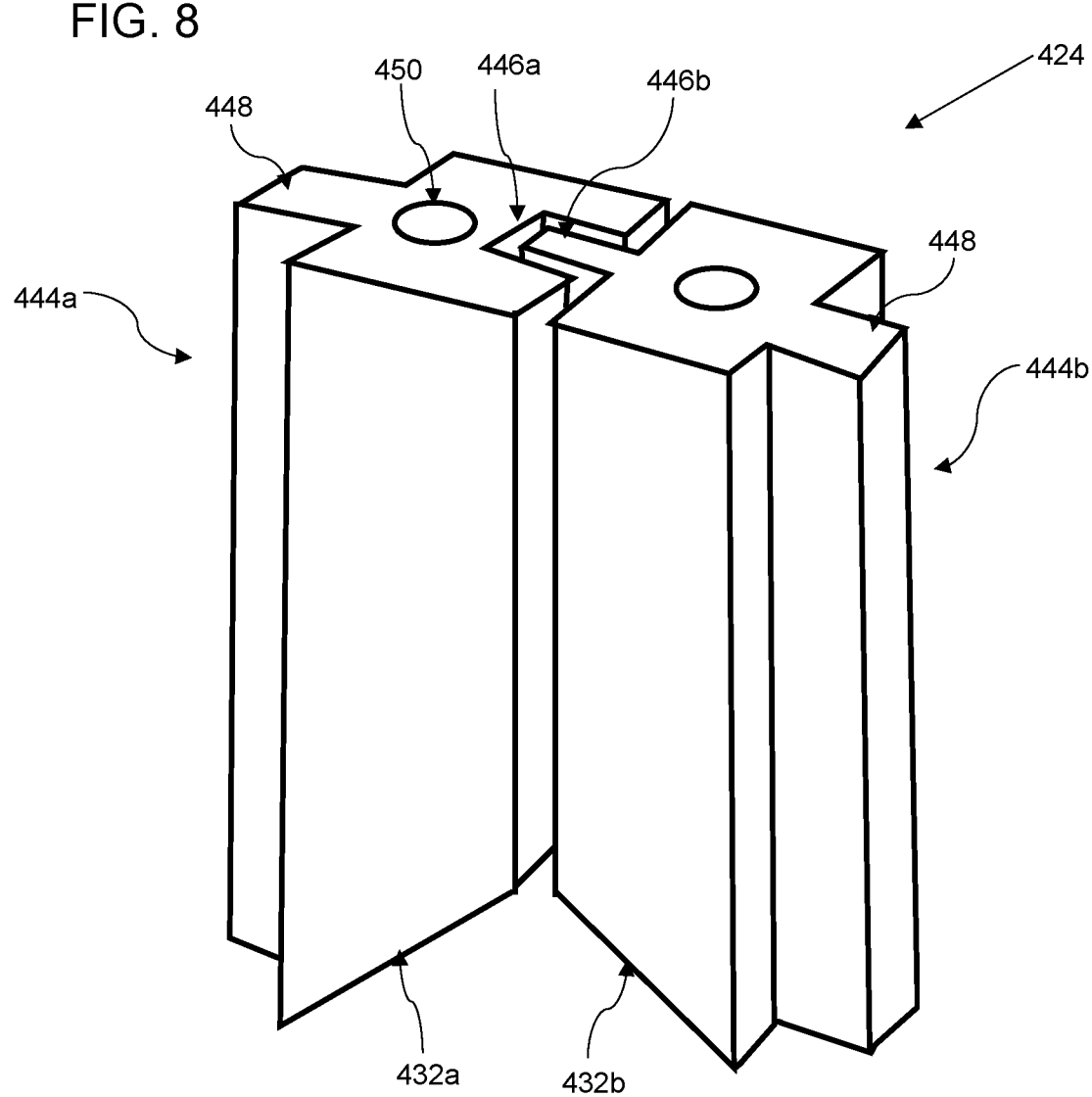
FIG. 8 shows a perspective representation of the pusher of the rotor bearing arrangement of FIG. 7.

A further alternative embodiment is illustrated in FIGS. 7 and 8, in which the rotor bearing arrangement is indicated generally at 438. Identical or similar components identified in respect of the first to fourth embodiments will be referenced using identical or similar reference numerals and further detailed description is omitted for brevity.

The bearing saddle 418 is identical to that of the third embodiment, being V-shaped. The pusher 424 is, however, no longer formed as a unitary block, instead having first and second independent pusher members 444a, 444b which respectively are urged by the biasing member towards the rotor shaft 14 during the operational condition of the electric motor.

To maintain uniformity of position and/or to prevent perpendicular displacement, a meshing interface may be provided between the first and second pusher member 444a, 444b, here illustrated as a finger element 446b of the second pusher member 444b which is receivable in a corresponding channel 446a of the first pusher member 446a. Outer locators 448, preferably formed as longitudinal projections on the side of each pusher member 444a, 444b, may also be provided which engage with corresponding channels of the rotor or a rotor support. Each pusher member 444a, 444b may also include their own biasing-member connector, such as a spring receiver 450, preferably engaged with a distal surface of the pusher member 444a, 444b to the corresponding contact area 432a, 432b.

In all of the previously-described embodiments, the biasing means for the rotor bearing arrangement has been provided as an element which applies a force on a side of the rotor shaft which is opposite to the bearing saddle.

It is therefore possible to provide a rotor bushing which is capable of providing four uniformly spaced points of contact on a rotor shaft to reduce the risk of rolling effects of the rotor shaft during use. This can be achieved by forming the rotor-shaft support surface of the bearing saddle having opposed surfaces.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A rotor bearing arrangement (38; 138; 238; 338; 438) to be rotatably mounted on a fixed rotor shaft (14) of an electric motor, the rotor bearing arrangement (38; 138; 238; 338; 438) having a longitudinal axis (L), the rotor bearing arrangement (38; 138; 238; 338; 438) comprising:
   a bearing saddle (18; 118; 218; 318; 418) for radially mounting on the rotor shaft (14) of the electric motor in an operating state of the electric motor; and
   a biasing means for exerting a biasing force (F1) towards the bearing saddle (18; 138; 238; 338; 438) in an operating state of the electric motor; and
   wherein the bearing saddle (18; 118; 218; 318; 418) is shaped such that the bearing saddle forms a dedicated main first contact area (36a; 136a; 236a; 336a) and a dedicated main second contact area (36b; 136b; 236b; 336b) designed to directly contact the rotor shaft (14) of the electric motor in an operating state of the electric motor.

2. The rotor bearing arrangement (38; 238; 438) as claimed in claim 1, wherein the bearing saddle (18; 218; 418) is or is substantially V-shaped in a plane perpendicular to the longitudinal axis (L).

3. The rotor bearing arrangement (238; 438) as claimed claim 2, wherein the first and second main contact areas (236a, 236b) are formed as planar surfaces of the V-shaped bearing saddle (218; 418).

4. The rotor bearing arrangement (38) as claimed claim 1, wherein a shape of at least one of the first and second main contact areas (36a, 36b) is at least in part concave in a plane perpendicular to the longitudinal axis (L).

5. The rotor bearing arrangement (38) as claimed in claim 4, wherein a radius of the at least in part concave first and/or second main contact area (36*a*, 36*b*) is larger than a radius of the rotor shaft (14) to be supported.

6. The rotor bearing arrangement (38) as claimed in claim 1, wherein a shape of at least one of the first and second main contact areas (36*a*, 36*b*) is at least in part convex in a plane perpendicular to the longitudinal axis (L).

7. The rotor bearing arrangement (38; 138; 238; 338; 438) as claimed in claim 1, wherein the biasing means comprises a pusher (24; 124; 224; 324; 424) having at least one dedicated further contact area (32*a*, 32*b*; 132; 232*a*, 232*b*, 232*c*, 232*d*, 232*e*; 332; 432*a*, 432*b*) designed to touch the rotor shaft (14) of the electric motor in an operating state of the electric motor.

8. The rotor bearing arrangement (38; 438) as claimed in claim 7, wherein the number of dedicated further contact areas (32*a*, 32*b*; 432*a*, 432*b*) is two.

9. The rotor bearing arrangement (38) as claimed in claim 7, further comprising at least one guide element (34) for guiding the pusher (24) uniformly towards the bearing saddle (18).

10. The rotor bearing arrangement (38; 438) as claimed in claim 7, wherein the dedicated first contact area (36*a*; 436*a*), the dedicated second contact area (36*b*; 436*b*) and the at least one dedicated further contact area (32*a*, 32*b*; 432*a*, 432*b*) are arranged relative to one another such that the biasing force is divided uniformly to the dedicated first contact area (36*a*; 436*a*) and the dedicated second contact area (36*b*; 436*b*) in an operating state of the electric motor.

11. The rotor bearing arrangement (438) as claimed in claim 7, wherein the pusher (424) comprises first and second pusher members (446*a*; 446*b*) that are arranged to move in a direction of the biasing force (F1).

* * * * *